(12) United States Patent
Okabe et al.

(10) Patent No.: US 6,410,849 B1
(45) Date of Patent: Jun. 25, 2002

(54) DRIP-PROOF STRUCTURE FOR A WIPER MOTOR DEVICE

(75) Inventors: Hiroji Okabe; Toshiyuki Amagasa, both of Ohta (JP)

(73) Assignee: Mitsuba Corporation, Kiryu (JP)

( * ) Notice: Subject to any disclaimer, the term of this patent is extended or adjusted under 35 U.S.C. 154(b) by 0 days.

(21) Appl. No.: 09/708,481

(22) Filed: Nov. 9, 2000

(30) Foreign Application Priority Data

Nov. 11, 1999 (JP) .......................................... 11-321199
Apr. 7, 2000 (JP) ........................................ 2000-106144

(51) Int. Cl.[7] .............................................. H01J 15/00
(52) U.S. Cl. ..................... 174/50; 174/58; 220/4.02; 310/68 R
(58) Field of Search ............................. 174/50, 66, 58; 220/3.8, 241, 4.02; 310/68 R, 85, 88

(56) References Cited

U.S. PATENT DOCUMENTS 4,487,328 A * 12/1984 Wilcox et al. ............... 220/241
5,177,325 A * 1/1993 Giammanco .................. 174/50
6,005,188 A * 12/1999 Teichler et al. ............... 174/50
6,285,101 B1 * 9/2001 Kazama et al. ............ 310/68 B

FOREIGN PATENT DOCUMENTS

GB 2192315 * 1/1988 ................ 174/66
JP U-6-25063 4/1994

* cited by examiner

Primary Examiner—Dean A. Reichard
Assistant Examiner—Dhiru R. Patel
(74) Attorney, Agent, or Firm—Oliff & Berridge, PLC

(57) ABSTRACT

A wiper motor device, in which a drive circuit portion and an output shaft are disposed adjacent to each other, capable of preventing water from reaching the drive circuit portion in a case where water invades along the output shaft, using an extension portion in which a cylindrical portion is externally fitted to the output shaft extends from the cover surrounding the upper opening of a casing which accommodates the drive circuit portion, and the lower part of a waterproof cap attached to the output shaft is externally fitted to the upper end part of the cylindrical portion.

9 Claims, 14 Drawing Sheets

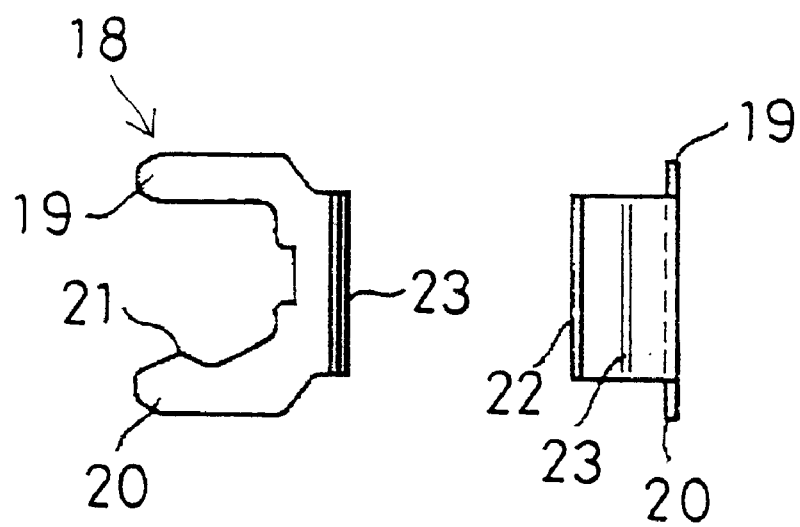
Fig. 8(A)    Fig. 8(B)
Fig. 8(C)
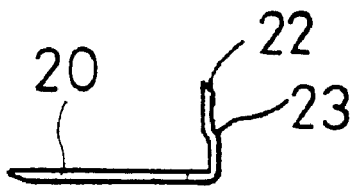

DRIP-PROOF STRUCTURE FOR A WIPER MOTOR DEVICE

BACKGROUND OF THE INVENTION

1. Field of Invention

The invention relates to the technical field of a wiper motor device applied to vehicles, such as automobiles and trucks.

2. Description of Related Art

Generally, in this type of a wiper motor device, there is a type in which an output shaft (wiper pivot axis) outputs motor drive via a reduction mechanism and a link mechanism, is disposed at a portion adjacent to a drive circuit portion while the drive circuit portion (circuit board, etc.) that incorporates circuits to execute various types of wiping actions, such as intermittent wiping, etc., is disposed inside a body sheet material (glass plate and body outer plate, etc.,). With such a wiper motor device, the tip end portion of the output shaft is caused to pass through an attaching hole opened in the body plate material to protrude outside the body, and a wiper arm is connected to the protruded tip end portion thereof. In such a device, the drive circuit portion is accommodated in an accommodation casing shielded with a cover in order to prevent foreign substances from adhering thereto. In this case, the cover is fixed at the accommodation casing by engaging engagement claws projecting from the accommodation casing into engagement holes opened in the cover.

In such a wiper motor device, it is necessary to prevent water from invading the body interior through the attaching through holes of the output shaft. Therefore, conventionally, a waterproof member, such as a grommet, etc., is attached to the attaching through holes of the output shaft, thereby preventing water from invading by using the waterproof member.

However, even though a waterproof member, such as a grommet, is attached, there are cases where water invades the body interior through a slight gap at the attaching through holes of the output shaft at the time of heavy rain or washing with high pressure water. And, for example, in the case where the drive circuit portion is disposed downward of the output shaft, there is a fear that the water, invading the body interior, flows into the drive circuit portion side and further invades the accommodation casing between the cover and accommodation casing or through the engagement holes. Therefore, if water or humidity that thus invaded the accommodation casing adheres to the drive circuit portion, it becomes a cause of failure of the drive circuit portion, which constitutes a problem.

SUMMARY OF THE INVENTION

The invention was developed to solve the problems and the shortcomings as described in the abovementioned situations. The invention comprises a drip-proof structure for a wiper motor device in which a drive circuit portion of a wiper motor is disposed adjacent to an output shaft of the wiper motor such that when a cover is provided to shield an upper opening of an accommodation casing for accommodating the drive circuit portion, an extension portion fitted to the outer circumference of the output shaft in a drip-proof state is formed on the cover and extends therefrom.

By this structure, even though water may invade along the output shaft, the water will flow on the cover from the output shaft via the extension portion, whereby it is possible to prevent water from invading the accommodation casing, and the drive circuit portion can be effectively protected from water.

In such a structure, a cylindrical portion fitted to the outer circumference of the output shaft is formed at the extension portion of the cover. By fitting the base end of the waterproof cap attached to the output shaft to the outer circumference of the tip end side of the corresponding cylindrical portion, it is possible to fit the extension portion to the output shaft in a drip-proof state.

Also, because a guide rib is formed at the upper surface portion of the cover, which guides water flowing on the upper surface of the cover to prevent the water from reaching the fixing portion that fixes the accommodation casing and cover, it is possible to prevent water from invading the accommodation casing from the fixing portion. Therefore, an excellent drip-proof structure can be obtained.

BRIEF DESCRIPTION OF THE DRAWINGS

The invention will be described with reference to the drawings, in which:

FIG. 6(A) is a front elevational view, FIG. 6(B) is a plan view, and FIG. 6(C) is a bottom view;

FIGS. 7(A) and 7(B) show a gear frame, wherein FIG. 7(A) is a front elevational view and FIG. 7(B) is a cross-sectional bottom view taken along the line 7—7 in FIG. 7(A);

FIGS. 8(A)–8(C) show a holder, wherein FIG. 8(A) is a front elevational view, FIG. 8(B) is a side elevational view, and FIG. 8(C) is a bottom view;

FIGS. 11(A) and 11(B) also show a state after the assembling is completed, wherein FIG. 11(A) is a sectional bottom view, and FIG. 11(B) is a cross-sectional view taken along the line 11—11 in FIG. 11(A);

DETAILED DESCRIPTION OF PREFERRED EMBODIMENTS

Figure 1:
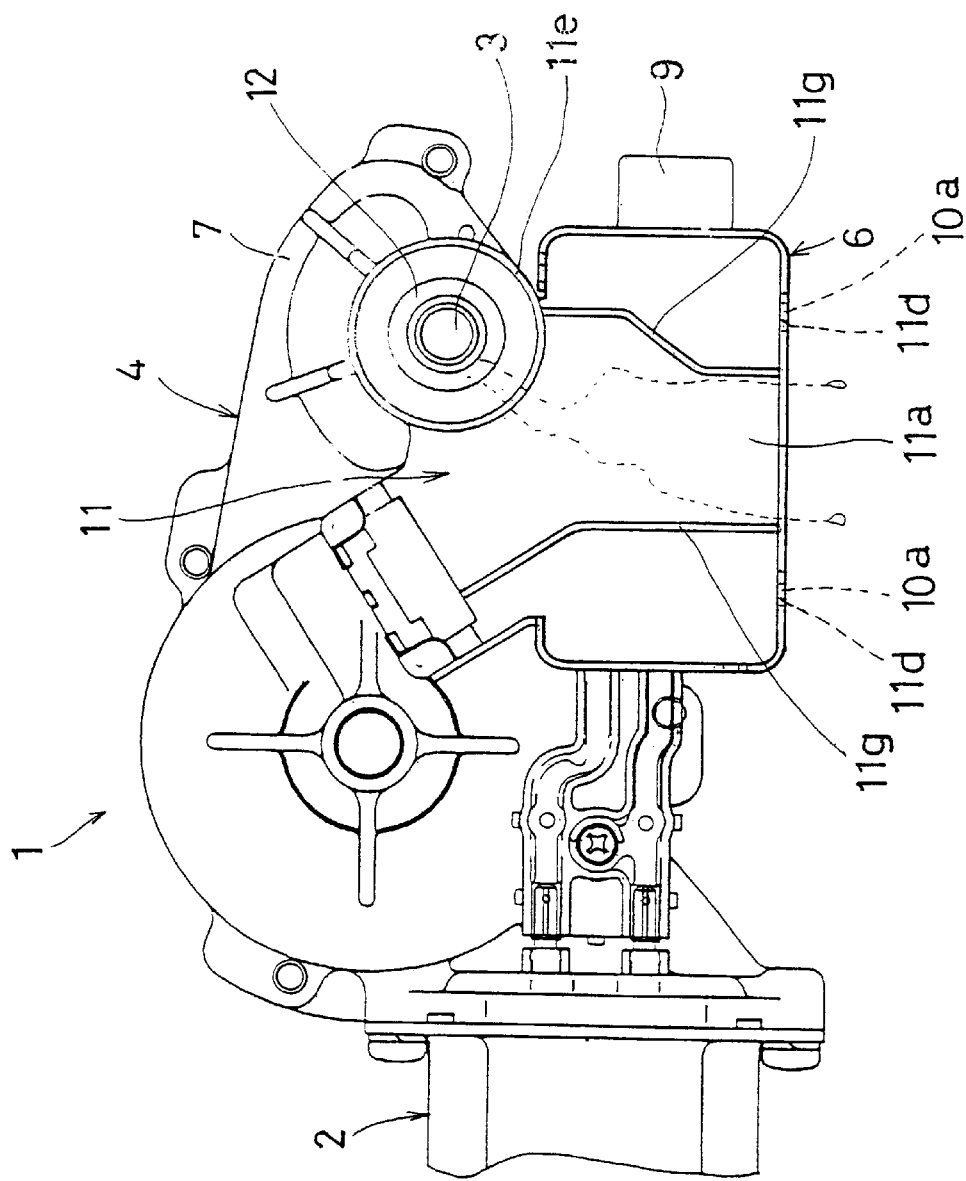
FIG. 1 is a plan view of a first embodiment of a wiper motor device.
Figure 2:
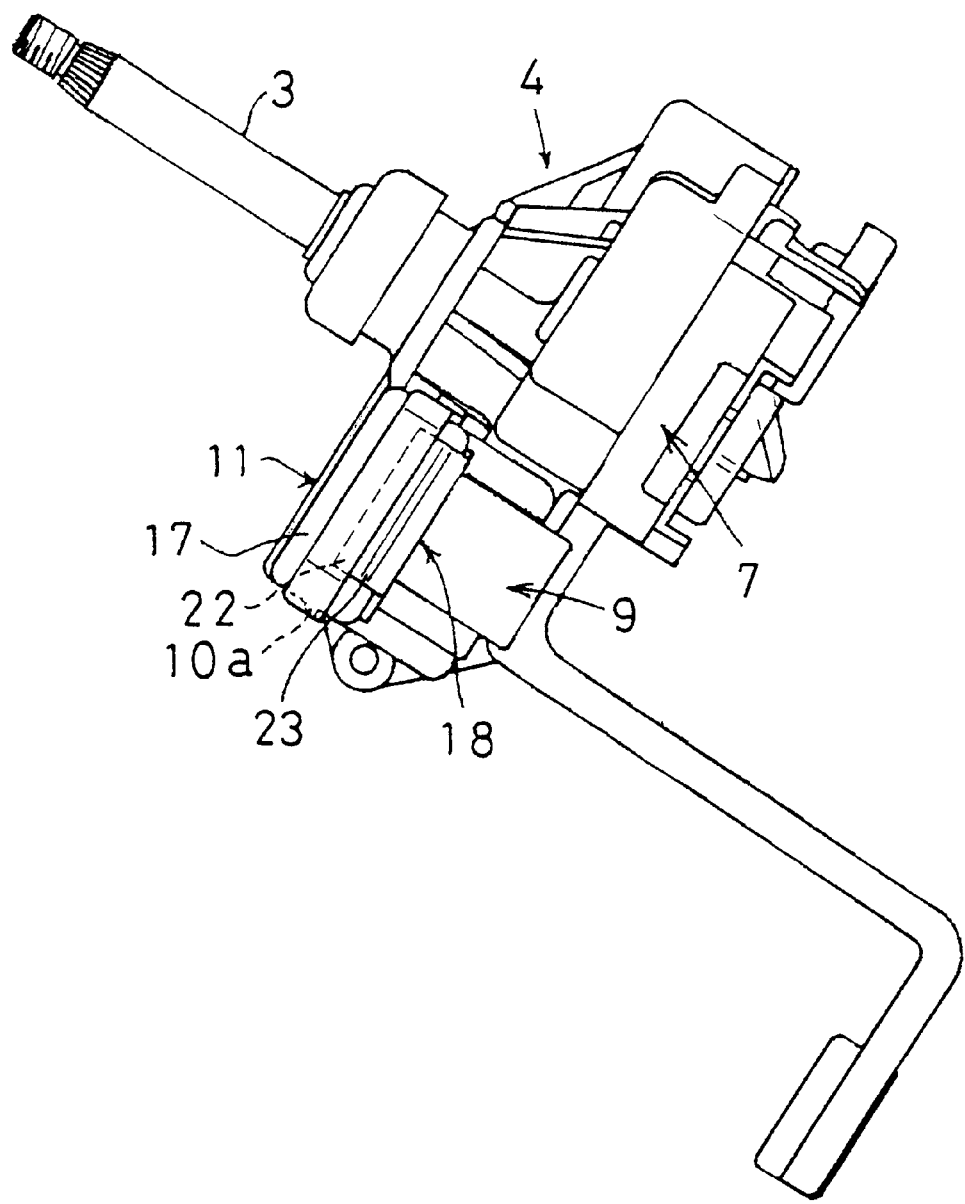
FIG. 2 is a side view of the wiper motor device.

Next, a description is given of embodiments of the invention with reference to the accompanying drawings, in which a wiper motor device 1 is provided to wipe off the rear window glass surface of a vehicle. The wiper motor device 1 is disposed inside a body plate material (glass plate and body plate (not illustrated)). The device 1 comprises a motor portion 2 provided with an electric motor (not illustrated), and gear portion 4 including a reduction mechanism (not illustrated), a link mechanism (not illustrated), an output shaft (wiper pivot axis) 3, and a drive circuit portion 6 provided with a circuit board 5, etc. The electric motor is driven and controlled by circuits incorporated into the circuit board 5. The drive force of the motor is outputted from the output shaft 3 via the reduction mechanism and the link mechanism. This basic structure is substantially the same as that of existing wiper motor devices.

On the other hand, a gear frame 7 accommodates the abovementioned gear portion 4. The output shaft 3 is rotatably supported by a sleeve 8 formed integrally with the gear frame 7. The tip end of the output shaft 3, which protrudes from the sleeve 8, passes through an attaching through hole (not illustrated) formed in the body plate material to protrude outside the body (that is, outside the body plate material). The base end portion of a wiper arm (not illustrated) is connected to the protruded tip end of the output shaft 3. Further, a grommet (not illustrated) is attached to the attaching through hole for the output shaft 3, by which water is prevented from invading from the attaching through hole into the body interior.

Figure 3:
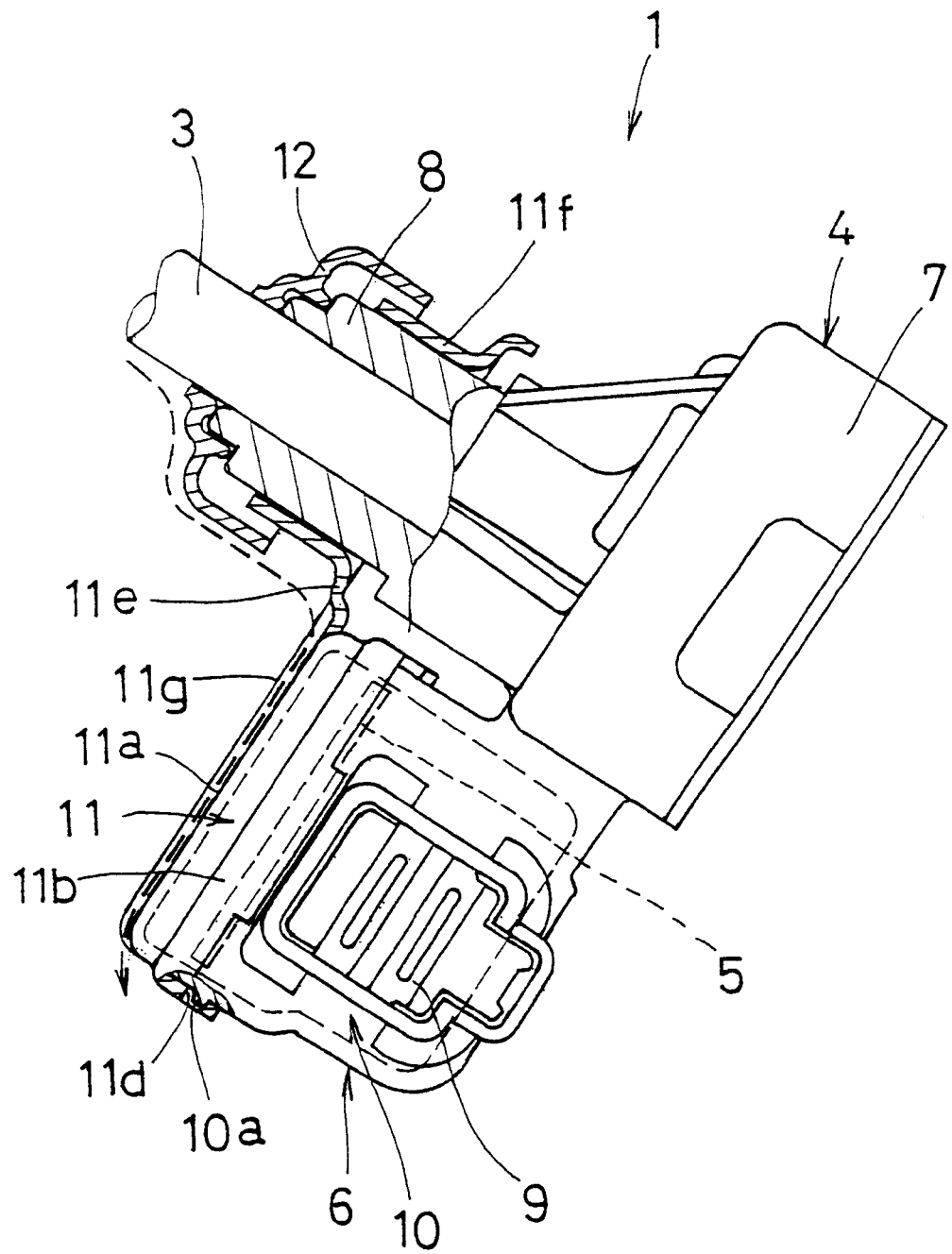
FIG. 3 is a partially cross-sectional side view showing an attached state of the wiper motor device.
Figure 4:
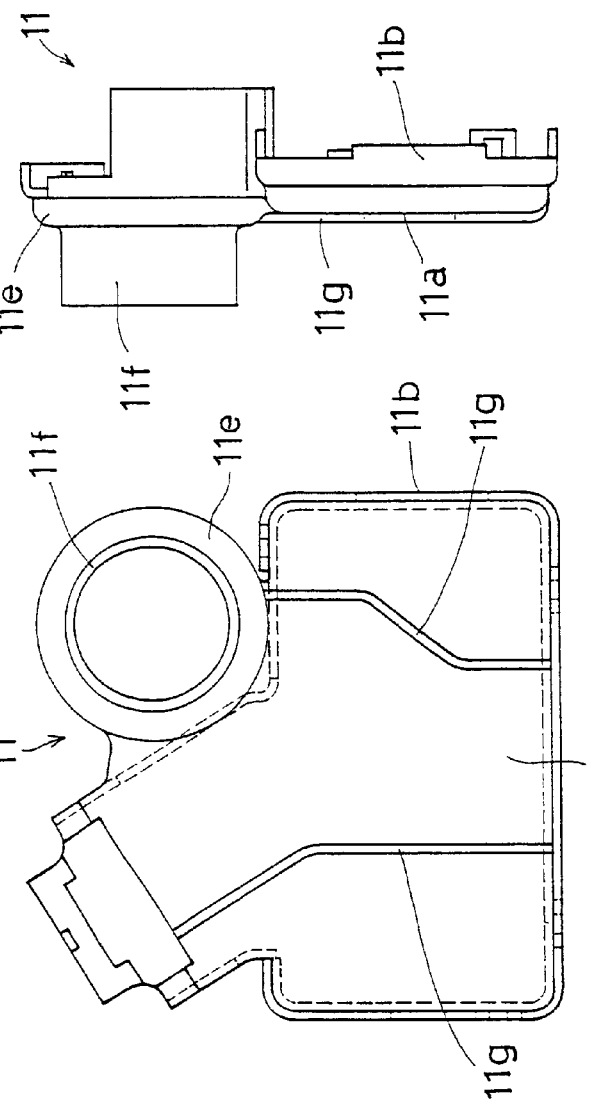
FIGS. 4(A), 4(B), 4(C) and 4(D) are, respectively, a plan view, a front elevational view, a left side view, and right side view of the cover.

Herein, in a first embodiment, the wiper motor device 1 is, as shown in FIG. 3, attached to the body side so that the tip end of the output shaft 3 extends obliquely upward in the side elevational view, and the drive circuit portion 6 is located obliquely downward of the base end portion of the output shaft 3. For convenience of explanation, the tip end of the output shaft 3 is referred to as "upward", and the base end is referred to as "downward" in a state where the wiper motor device 1 is not attached to the body side.

On the other hand, the drive circuit portion 6 is accommodated in an accommodation casing 10, which is formed integrally with the gear frame 7, in a form in which wires (not illustrated) and a coupler 9, etc., to which an electric motor is connected are attached to the circuit board 5, wherein the upper side of the accommodation casing 10 is open, and the upper opening is shielded by a cover 11.

The abovementioned cover 11 is such that a side portion 11b is formed so as to be bent downward from the outer circumferential edge of the plate-like upper surface portion 11a. Further, a plurality of tongues 11c are formed to protrude downward from the lower end of the side portion 11b, wherein engagement holes 11d are provided to be open in the tongues 11c. On the other hand, engagement claws 10a corresponding to the engagement holes 11d of the cover, are provided on the upper portion of the abovementioned accommodation casing 10 so as to protrude therefrom. And, when incorporating the cover 11 over the upper opening of the accommodation casing 10, the cover 11 is fixed to the accommodation casing 10 by engaging the engagement claws 10a in the engagement holes 11d.

Further, an extension portion 11e is formed on the upper surface portion 11a of the cover 11 so as to extend therefrom to the position surrounding the outer circumference of the sleeve 8 that pivotally supports the output shaft 3. A cylindrical portion 11f fitted to the outer circumference of the sleeve 8 is integrally formed with the extension portion 11e in a state where the cylindrical portion 11f is erect upward from the extension portion 11e. Subsequently, the upper end of the sleeve 8 protrudes from the upper end of the cylindrical portion 11f, and as described above, the output shaft 3 is protruded from the upper end of the sleeve 8.

On the other hand, 12 indicates a waterproof cap. The waterproof cap 12 is made cylindrical so that its diameter is increased stepwise downward (two stages in the present embodiment). The upper end portion of the cap 12 is attached to the protrusion lower end portion of the output shaft 3 protruding from the sleeve 8 in a slightly pressure-fitted state. Also, the lower portion of the waterproof cap 12 is fitted to the outer circumference of the upper part of the cylindrical portion 11f of the abovementioned cover 11, and a labyrinth is formed between the lower part of the waterproof cap 12 and the upper part of the cylindrical portion 11f.

Figure 5:
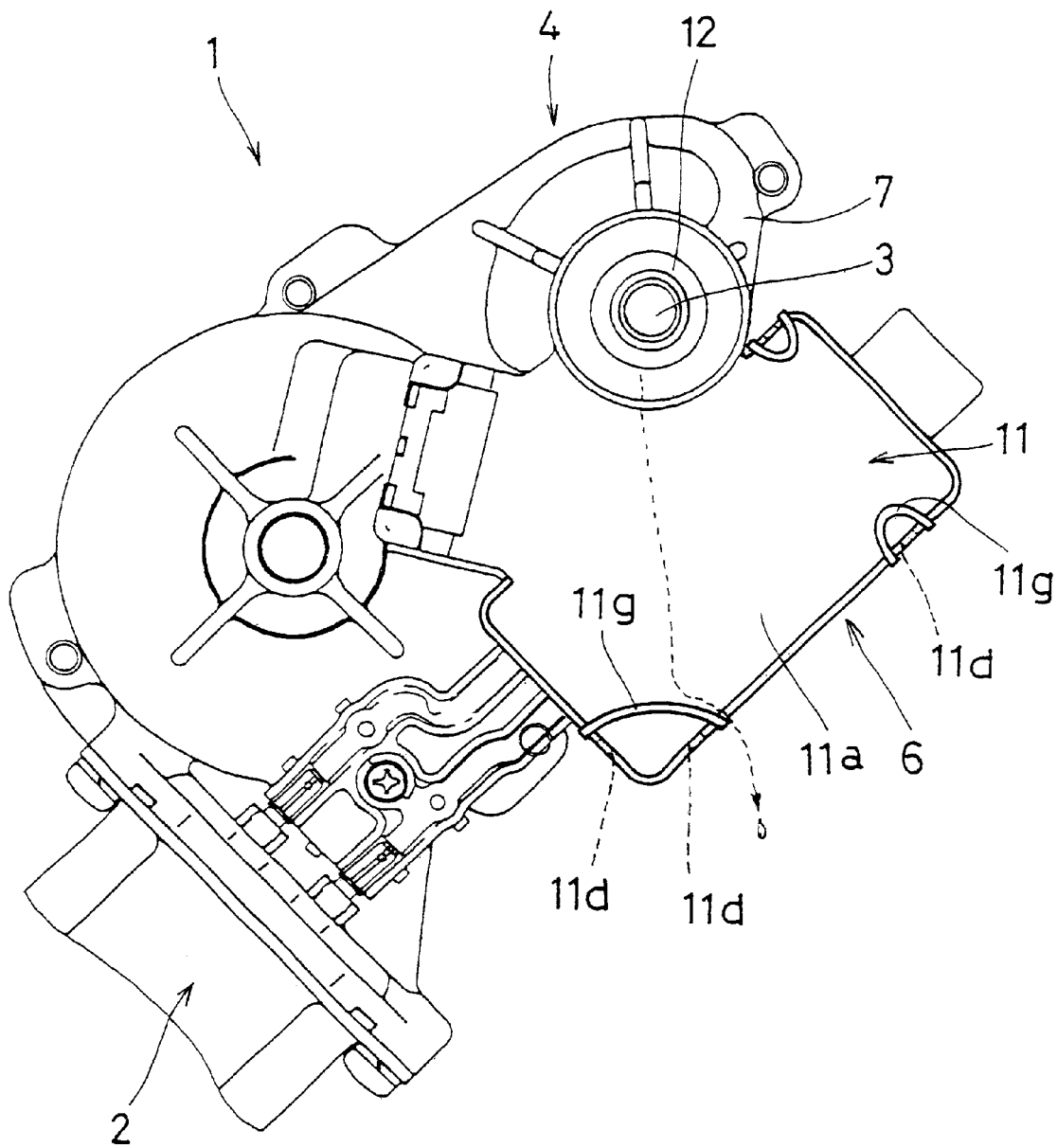
FIG. 5 is plan view of a wiper motor device according to a second embodiment.
Figure 6A:
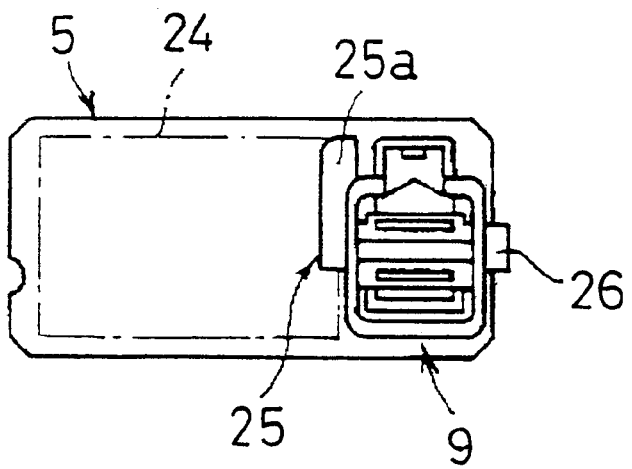
FIGS. 6(A)–6(C) show a circuit board provided with a coupler, where
Figure 6B:
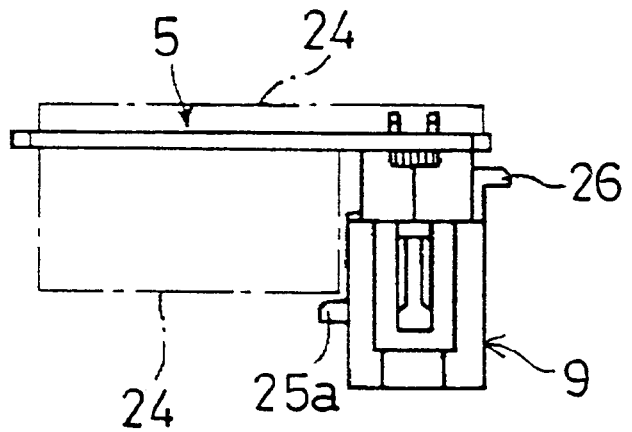
Figure 6C:
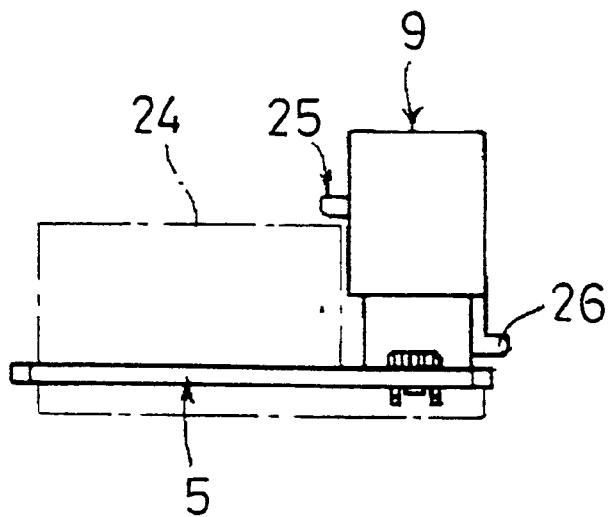

Still further, a guide rib 11g projects from the upper surface portion 11a of the cover 11 in a state where the wiper motor device 1 is attached at the body side, and the guide rib 11g can guide water flowing on the upper surface portion 11a so that the water does not flow into the engagement holes 11d. In the mode of the embodiment, the guide rib 11g is, as shown in FIG. 1, located inside the engagement holes 11d with respect to the output shaft 3. However, the attaching thereof is not limited to this mode. As in the mode of the second embodiment shown in FIG. 5, the guide rib 11g may extend so as to surround the engagement holes 11d. That is, because the guide rib 11g is provided, according to the attached state of the wiper motor device 1 and position of the engagement holes 11d, to guide water on the upper surface portion of the cover 11 so that water flowing thereon does not flow into the engagement holes 11d, the shape and/or position of the guide ribs 11g are not particularly limited.

Figure 7A:
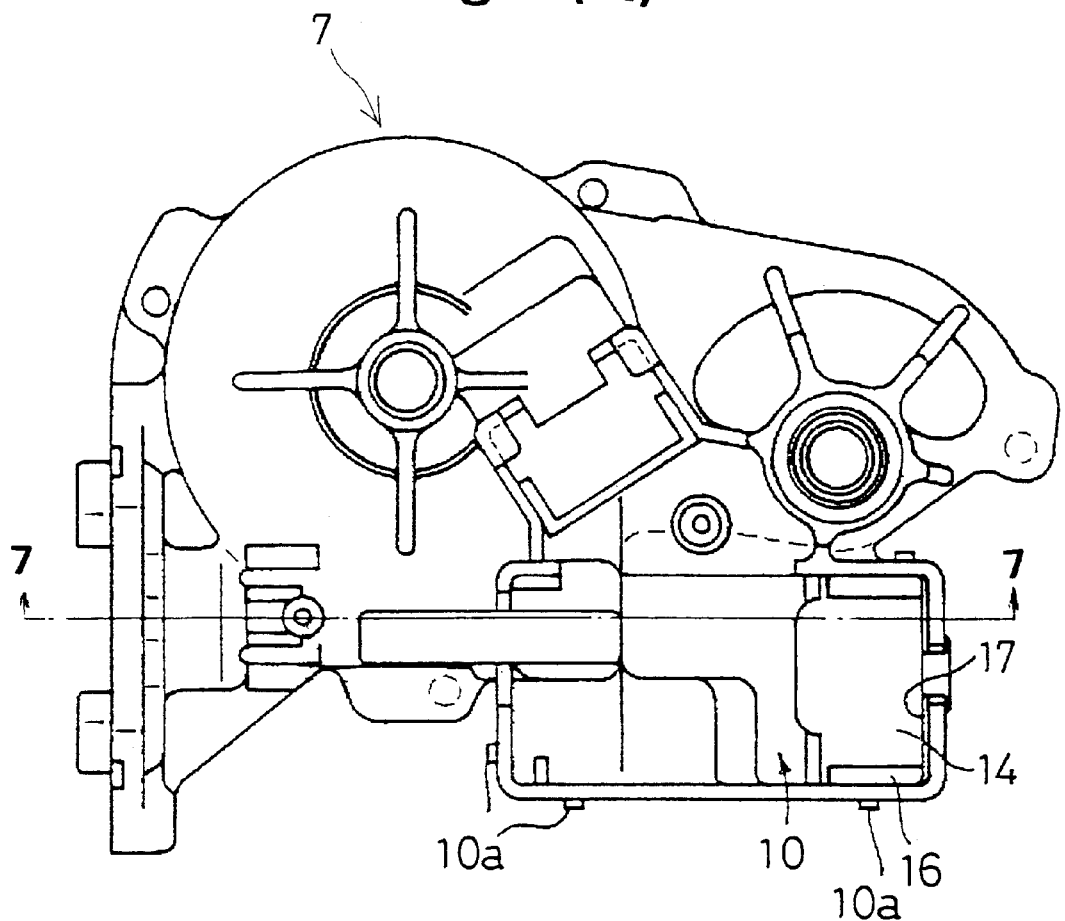
Figure 7B:
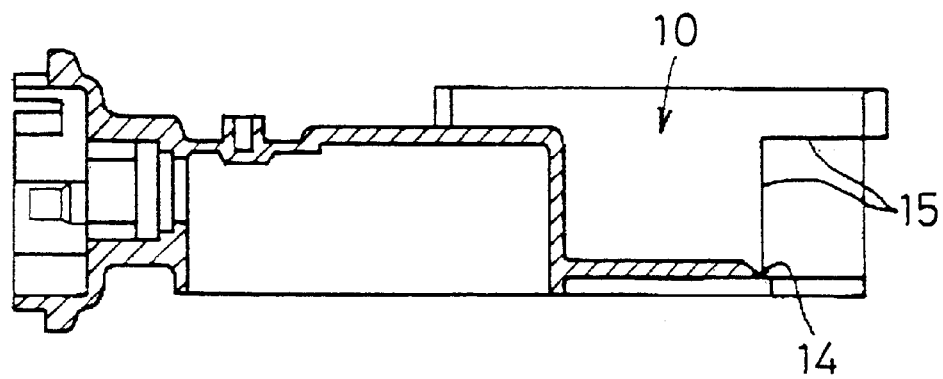
Figure 9:
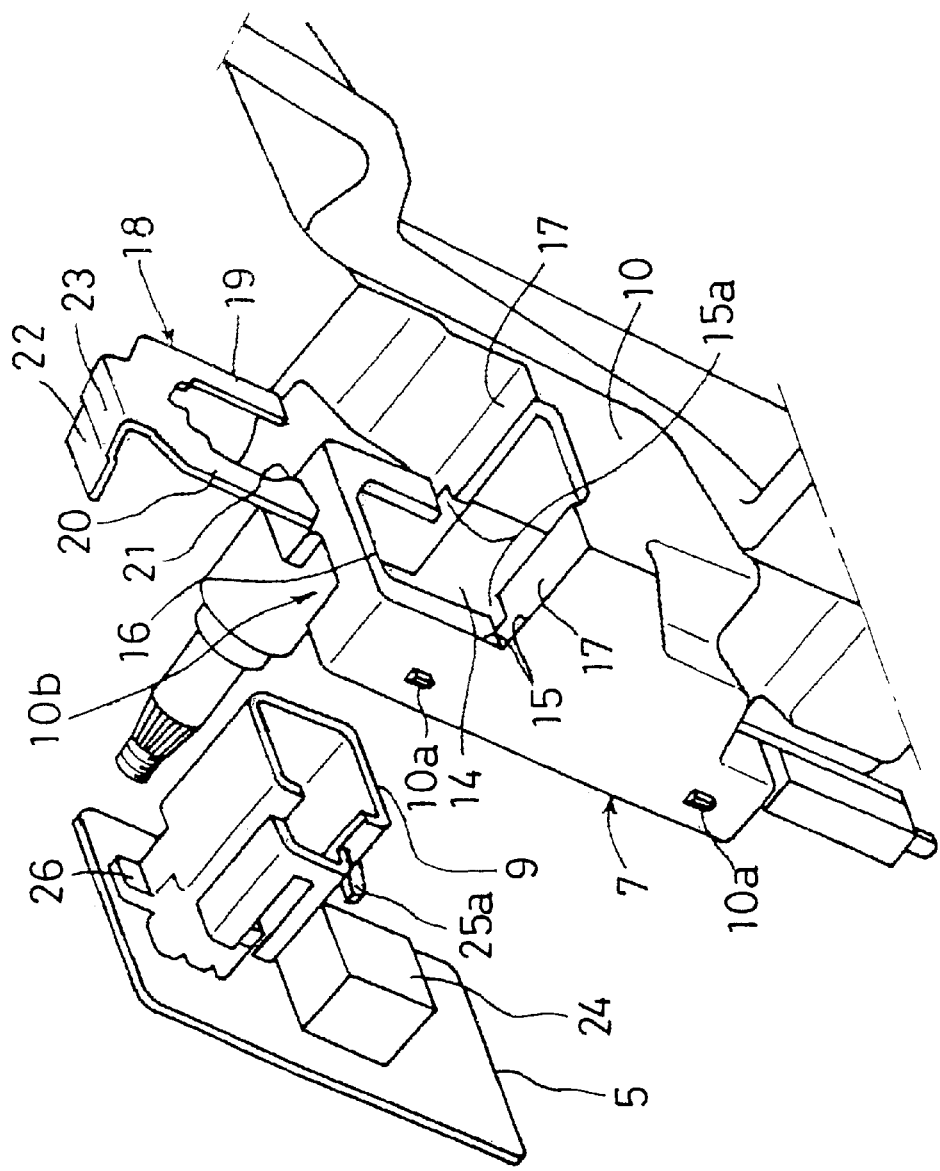
FIG. 9 is a partially disassembled perspective view showing assembling work.

As shown in FIGS. 7(A) and 7(B), the accommodation casing 10 is disposed at the lower part of the main surface (hereinafter referred to the front elevation) at the side where the output shaft 3 of the gear frame 7 protrudes, and is formed so as to form a rectangular hollow hole which is similar to the circuit board 5 in shape but is larger in size than the circuit board 5. An insertion hole 14 into which a coupler 9 is inserted is provided on the bottom wall of the accommodation casing 10 so as to be opened, and a notched portion 15 is formed at three side walls of the insertion hole 14 of the side walls of the accommodation casing 10. An external force receiving portion 16, that receives an external force applied to the coupler 9, is formed on the rear of the notched portion 15. Further, a twisting force receiving portion 17 that receives a twisting force applied to the coupler 9 is formed at one side of the notched portion 15.

Figure 11A:
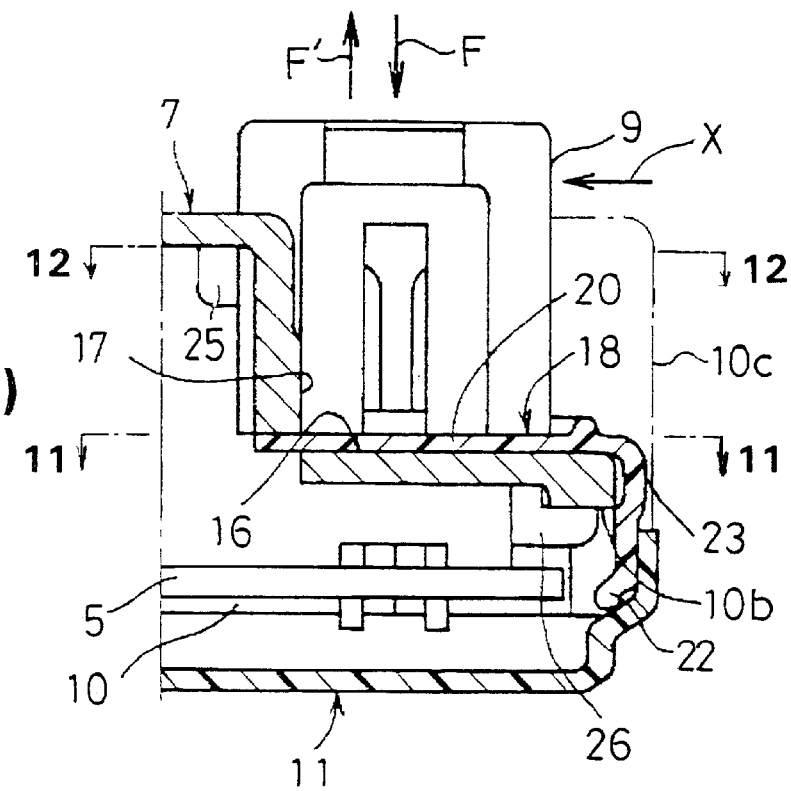

In the first embodiment, a holder 18, equipped with the wiper motor device 1, is made of resin and is, as shown in FIGS. 8(A)–8(C), integrally formed so as to be bifurcated like a fork in its front elevational view (FIG. 8(A)). The inner diameter of a pair of bifurcated insertion portions 19 and 20 is set to be almost equal to the outer diameter of the coupler 9, wherein the pair of bifurcated insertion portions can be fitted onto the outer circumference of the coupler 9. An engagement part 21 that looks roughly like an isosceles triangle in its front elevational view is formed to protrude at the tip end portion inside one of the insertion portions (hereinafter referred to as a lower insertion portion). The engagement part 21 is engaged with the lower corner of the coupler 9 when a holder 18 is fitted to the coupler 9, whereby the holder 18 itself is prevented from slipping off. A fixing part 22 (FIG. 8(B)) whose side elevational view is roughly rectangular is made erect at a right angle at side edges opposed to both insertion portions 19, 20 of the holder 18, and a bending part 23 is formed at an intermediate portion of the fixing part 22 so that the tip end thereof can be moved in parallel to the direction of both insertion portions 19, 20. The tip end portion of the fixing part 22 is set to be engaged with the cover 11 from the outside in a state where the holder 18 is fitted to the coupler 9. In addition, as shown in FIG. 11(A), the bending part 23 is provided so that it has a gap between the inner circumferential side thereof and the outer wall of the accommodation casing 10, whereby it is possible to prevent it from interfering with the edge part of the external force receiving portion 16.

Figure 10:
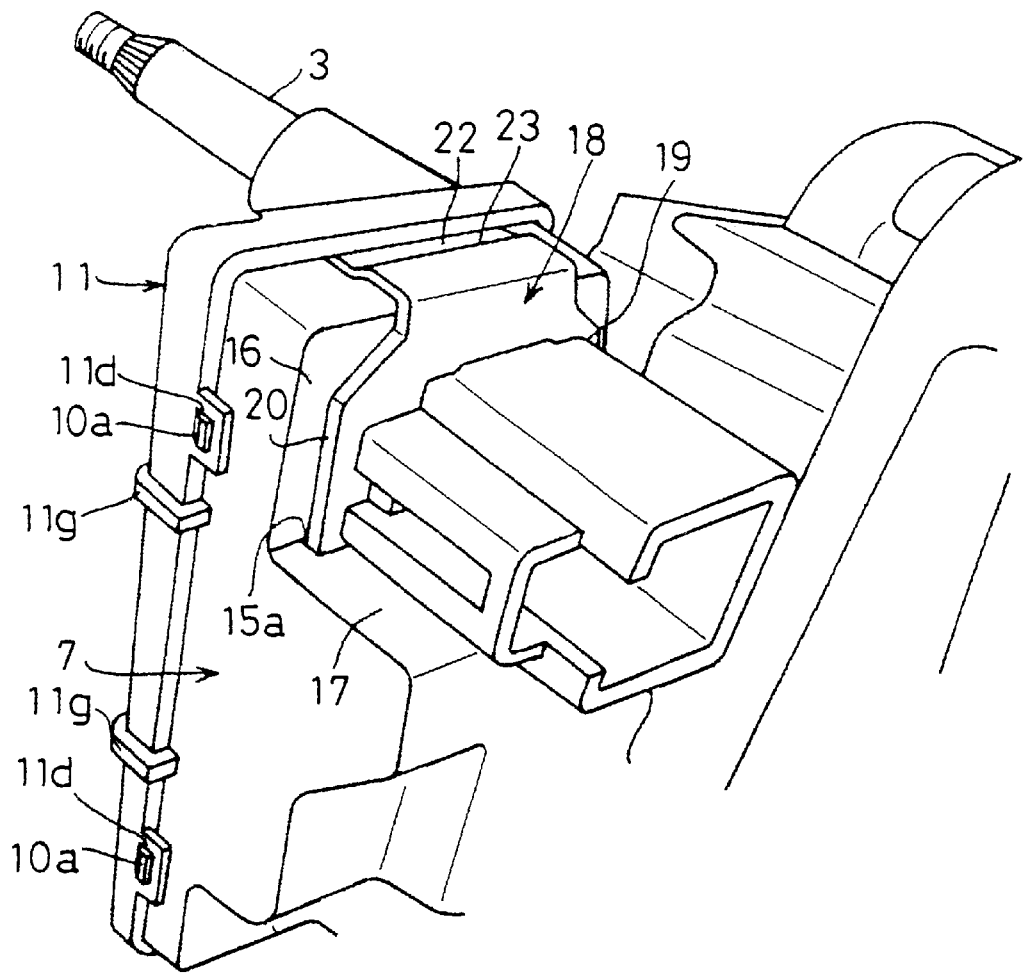
FIG. 10 is a perspective view showing a state after the assembling is completed.

When the coupler 9 is accommodated in the accommodation casing 10, the circuit board 5 is to be positioned with respect to its forward, vertical and left and right directions as the front main surface (hereinafter referred to the front surface) is brought into contact with the bottom (rear surface) of the accommodation casing 10, and the outer circumference is brought into contact with the side wall internal surface of the four sides (hereinafter referred to the vertical and left and right sides) of the accomodation casing 10. Also, as shown in FIG. 10, the coupler 9 is exposed at the notched portion of the gear frame 7, wherein the side (hereinafter referred to the left side) of a controller 24 is brought into contact with the twisting force receiving portion 17.

Subsequently, as the holder 18 is fitted onto the outer circumference of the coupler 9 at the notched portion 15, the holder 18 clogs the insertion hole 14 and enters a state where it is engaged with a part of the rear surface of the coupler 9. Therefore, the circuit board 5 is prevented by the holder 18 from coming off rearward.

Figure 11B:
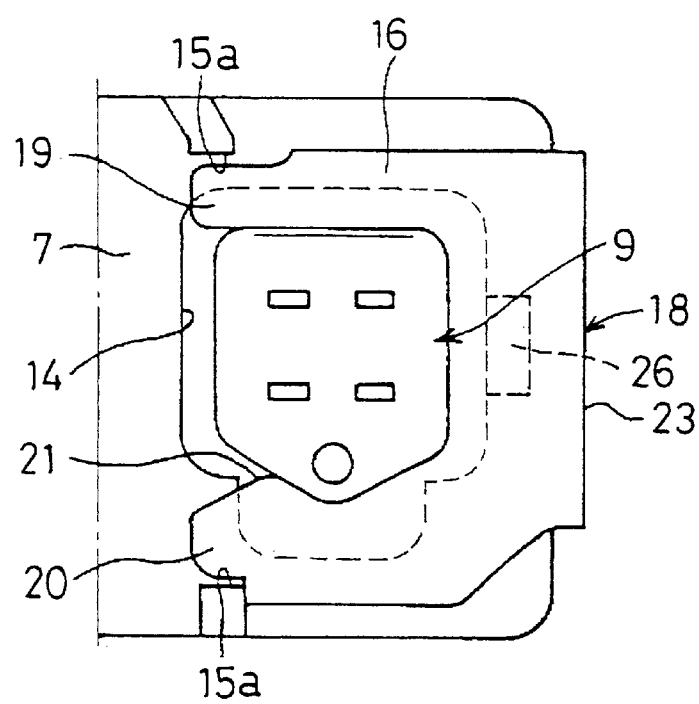

In addition, as shown in FIG. 11(B), because the engagement part 21 of the lower insertion portion 20 of the holder 18 will be engaged with a part of the outer circumference of the coupler 9, the holder 18 itself can be prevented from falling down away from the outer circumference of the coupler 9. Further, the tip end portions of the insertion portions 19 and 20 are inserted into the notched groove 15a secured downward of the twisting force receiving portion 17 of the notched portion 15, wherein the coupler 9 can be prevented from escaping from the insertion hole 14 even in the case where the gear frame 7 moves after the holder 18 is fitted to the coupler 9, and the circuit board 5 can be prevented from falling downward from the accommodation casing 10.

A wiper motor device 1 produced as described above is installed below the window of a vehicle, and when a mating coupler (not illustrated) wired at the vehicle side is connected to the coupler 9, an insertion force of the mating coupler indicated by the arrow F in FIG. 11(A) is applied to the coupler 9. If the insertion force F is applied to the circuit board 5, there is a fear that the circuit board 5 itself and controller 24 (electric wires, electric components, and soldered parts) may be damaged, wherein the reliability of the circuit board 5 is lowered. However, because, in the mode of the embodiment, the external force receiving portion 16 of the gear frame 7 is engaged in the coupler 9 via the holder 18, the insertion force F of the mating coupler can be received by the external force receiving portion 16 of the gear frame 7 via the holder 18, wherein the insertion force F of the mating coupler can be prevented from being applied to the circuit board 5, and it is possible to prevent the circuit board 5 from being damaged by the insertion force of the mating coupler into the coupler 9.

Figure 12:
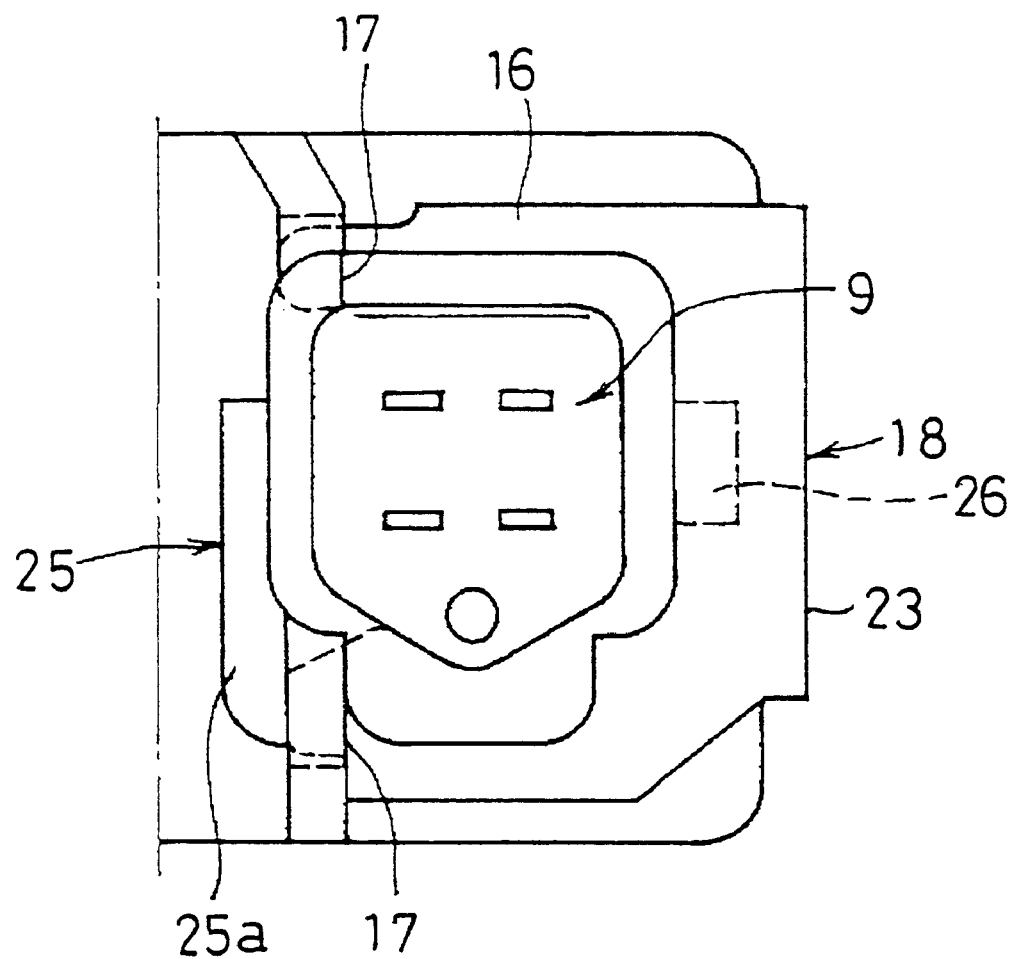
FIG. 12 is a sectional view taken along the line 12—12 in FIG. 11(A)

Also, even though a twisting force indicated by the arrow X in FIG. 11(A) is applied when inserting the mating coupler into the coupler 9, the side of the coupler 9 is brought into contact with the twisting force receiving portion 17, wherein the left engagement piece 25 is brought into contact with the rear side of the gear frame 7, the right engagement piece 26 is brought into contact with the end portion of the accommodation casing opening 10b of the gear frame 7, and, as shown in FIG. 12, the extension portion 25a of the left engagement piece 25 is engaged with the edge of the twisting force receiving portion 17. Thereby, the gear frame 7 can receive stress applied to the coupler 9. Therefore, the twisting force X is prevented from being applied to the circuit board 5. Also, the circuit board 5 can be prevented, in advance, from being damaged by the twisting force X when inserting the mating coupler into the coupler 9. On the other hand, as for a force F' resulting when disconnecting the mating coupler from the coupler 9, as the left engagement piece 25 of the coupler 9 is brought into contact with the rear side of the gear frame 7 and the right engagement piece 26 is brought into contact with the end of the accommodation casing opening 10b of the coupler 9, the gear frame 7 does not directly receive the disconnecting stress, whereby it is possible to prevent damage to the circuit board 5.

Further, in the embodiment, because the notched portion 15 is formed at the side wall of the insertion hole 14 of the accommodation casing 10, the weight of the gear frame 7 can be further lightened in comparison with such a type as shown in dot-dash line in FIG. 11(A) in which a portion 10c surrounding the entire circumference of the coupler 9 is formed at the insertion hole 14 of the coupler 9 of the accommodation casing 10 of the gear frame, and the coupler 9 can be exposed at the notched portion 15. Therefore, coupling work of the mating coupler into the coupler 9 can be facilitated.

Figure 13:
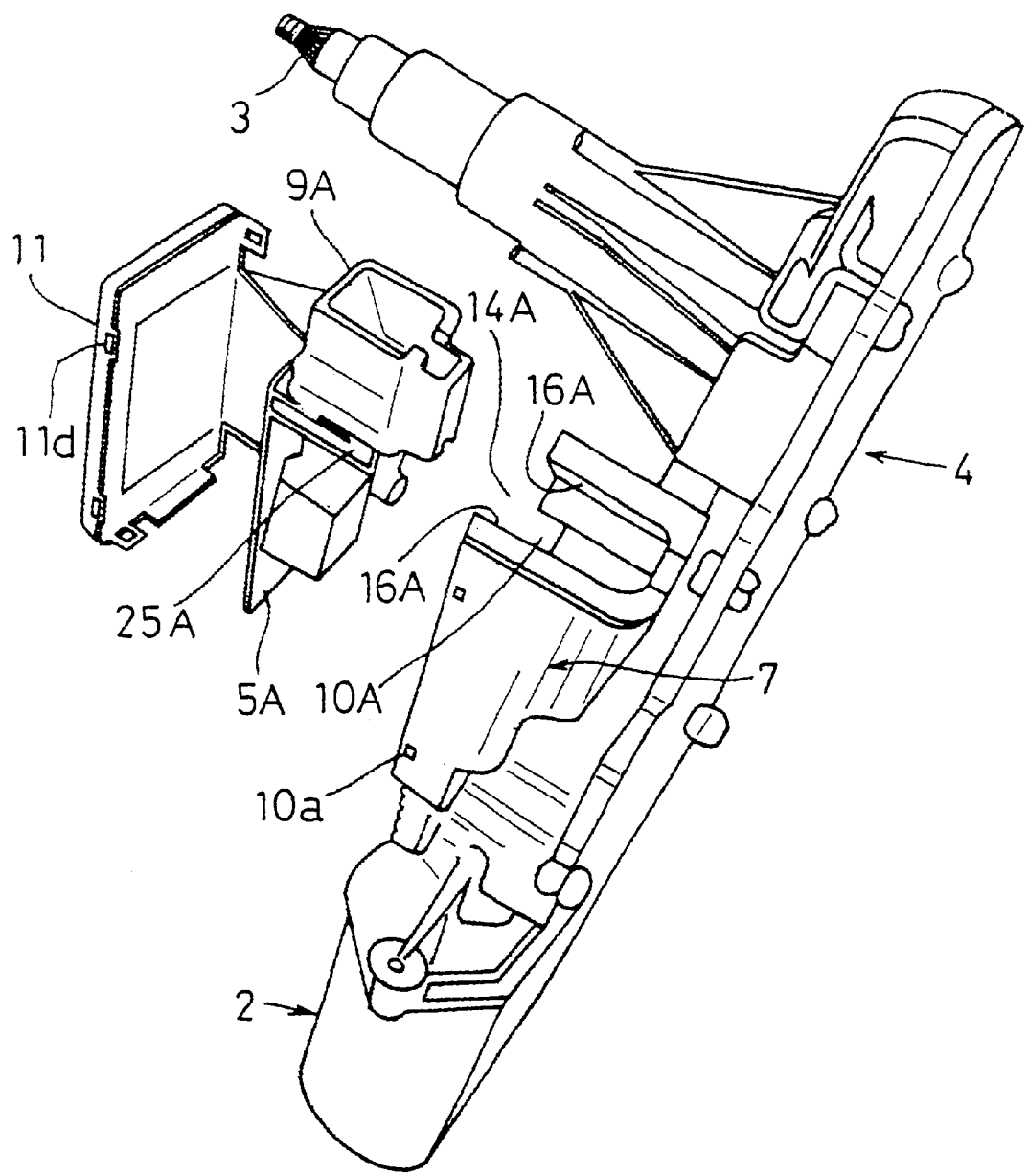
FIG. 13 is a partially disassembled view showing a wiper motor device according to a third embodiment.
Figure 14:
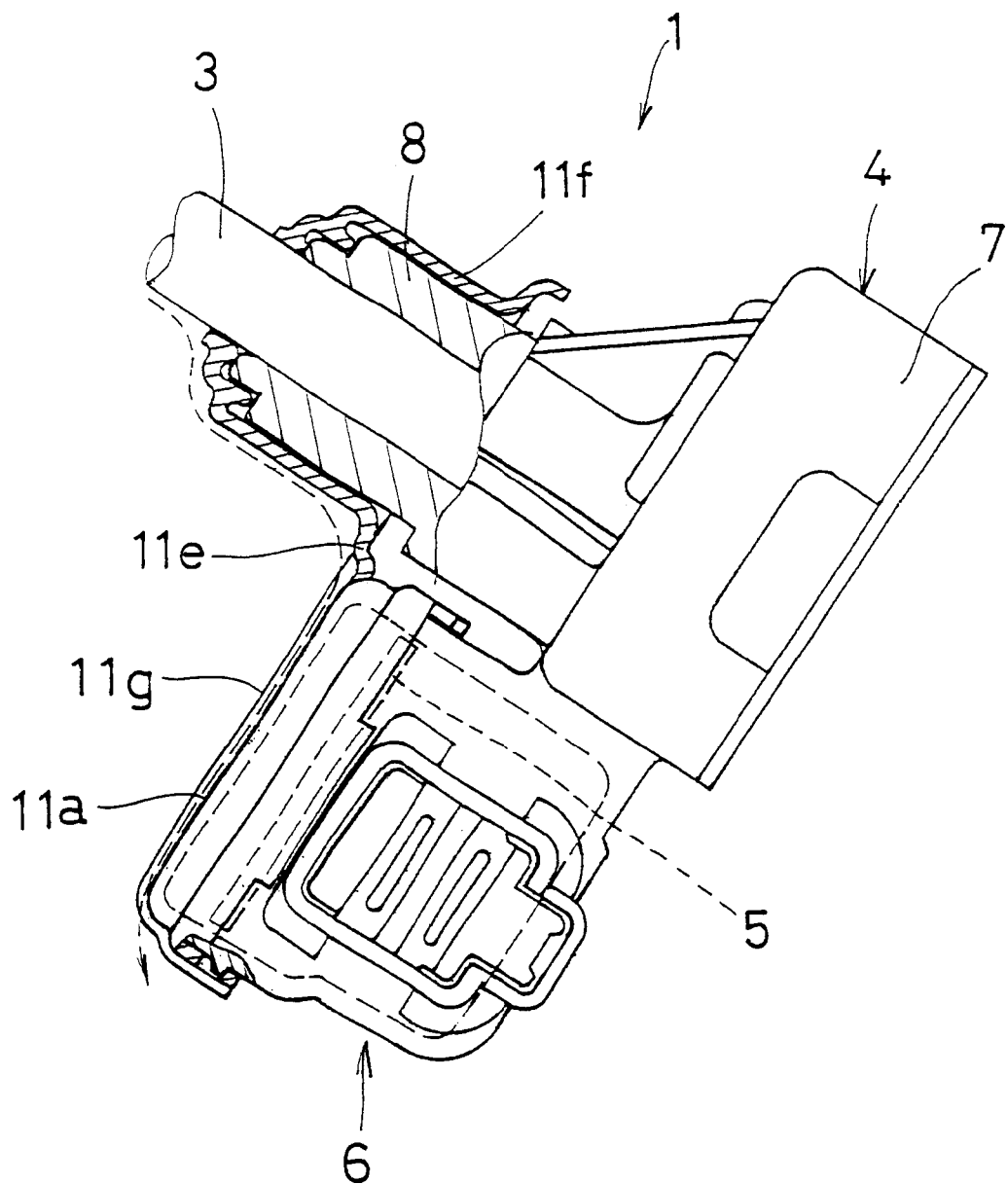
FIG. 14 is a partially sectional side elevational view of a wiper motor device according to a fourth embodiment.

In addition, as the third embodiment shown in FIG. 13, such a structure may be employed in which the circuit board 5A is inserted into the accommodation casing 10A in a state where the coupler 9A constitutes a right angle with respect to the axial center direction of the output shaft 3. The coupler 9A fixed laterally at the circuit board 5A is laterally inserted into the insertion hole 14A of the accommodation casing 10A from rearward, wherein when the circuit board 5A is accommodated in the accommodation casing 10A, the circuit board 5A is positioned with respect to the forward and four sides (hereinafter called vertical, left and right directions) of the accommodation casing 10A since the front side main surface (hereinafter called the front side) is brought into contact with the bottom (rear side) of the accommodation casing 10A and the outer circumference is brought into contact with the four sides of the chamber 10A. Thereafter, when the cover 11 is placed on the gear frame 7, the cover 11 presses the circuit board 5A from the outside, wherein the circuit board 5A is completely prevented from coming out from the accommodation casing 10A. In this state, even though an insertion force and/or a twisting force are applied to the coupler 9A when coupling the coupler 9A to the coupler gear frame 7, the gear frame 7 can directly receive such forces from the coupler 9A because the flange portion 16A of the gear frame 7 is fitted in a retaining groove 25A in the coupler 9A. Therefore, such forces will not be applied to the circuit board 5A, and it is possible to prevent the circuit board 5A from being damaged by such forces.

In such a type structured as described above, the wiper motor device 1 is attached to the body side in a state where the drive circuit portion 6 is positioned downward of the output shaft 3. The extension portion 11e is formed on the cover 11 to enclose the upper opening of the accommodation casing 10, in which the drive circuit portion 6 is accommodated, so as to extend to the sleeve 8 which pivotally supports the output shaft 3, the cylindrical portion 11f that is fitted to the outer circumference of the sleeve 8 is made erect at the extension portion 11e, and the lower end of the waterproof cap 12 pressure-fitted and attached to the output shaft 3 is externally fitted to the upper part of the cylindrical portion 11f.

As a result, even in a case where water invades inside the body of the vehicle, for example, from the attaching hole portion of the body plate material along the output shaft 3, the invaded water flows, as shown in FIG. 3, onto the upper surface portion 11*a* along the outer circumferential side of the cylindrical portion 11*f* from the outer circumferential side of the waterproof cap 12 and flows downward on the upper surface portion 11*a*. Accordingly, water flowing between the gear frame 7 and the accommodation casing 10 and invading the accommodation casing 10 can be prevented. Thereby, it is possible to effectively protect the circuit board 5 in the accommodation casing 10 from humidity.

In addition, because the cover 11 is fixed to the accommodation casing 10, the cylindrical portion 11*f* will not move at all. However, the waterproof cap 12 is slightly pressure-fitted to the output shaft 3 and rotates along with the output shaft 3. Further, since a labyrinth structure in which the edge of the cylindrical portion 11*f* overlaps that of the waterproof cap 12 is employed, no adverse influence is applied to the drive of an electric motor by using the waterproof cap 12, wherein it is possible to favorably display a drip-proof effect.

Still further, in this type, because such a structure is employed, in which water flowing downward on the upper surface portion 11*a* of the abovementioned cover 11 is guided so as to avoid the engagement holes 11*d* by the guide rib(s) 11*g* formed on the upper surface portion 11*a*, it is possible to securely prevent water from invading through the engagement holes 11*d*, wherein a further improved drip-proof structure can be achieved.

Needless to say the invention is not limited to the abovementioned embodiments. Without providing a waterproof cap as a separate member, the upper end portion of the cover cylindrical portion 11*f* may be constructed as an integral structure in which it is fitted to the output shaft 3 protruding from the upper end of the sleeve 8 in a drip-proof state, wherein effects similar to the above can be achieved.

What is claimed is:

1. A drip-proof structure for a wiper motor device in which a drive circuit portion of a wiper motor is disposed adjacent to an output shaft of the wiper motor, wherein when providing a cover to shield an upper opening of an accommodation casing for accommodating said drive circuit portion, an extension portion for receiving dripping water from said output shaft is extendedly formed on said cover and extends along the output shaft.

2. A drip-proof structure for a wiper motor device as set forth in claim 1, wherein the extension along the output shaft and a cylindrical portion fitted to the outer circumference of said output shaft and formed on said extension portion of said cover, and the base side of a waterproof cap attached to said output shaft is outwardly fitted to the tip end side of said cylindrical portion to create a drip-proof structure.

3. A drip-proof structure for a wiper motor device as set forth in claim 2, wherein a guide rib is provided and formed on the upper surface of said cover, said guide rib guides water flowing on said upper surface so as to prevent the water from flowing into a fixing portion which fixes said accommodation casing and cover.

4. A drip-proof structure for a wiper motor device as set forth in claim 1, wherein a guide rib is formed on the upper surface of said cover, said guide rib guides water flowing on said upper surface so as to prevent the water from flowing into a fixing portion which fixes said accommodation casing and cover.

5. A drip-proof structure for a wiper housing from which an operating shaft extends, the wiper housing enclosing at least a drive mechanism, a control circuit board, and an electric coupler, the drip-proof structure comprising:

a case body having an open side portion; and a cover for mounting on and covering the open side portion of the case body, an extension of the cover having an opening through which the operating shaft extends, the extension including a cylindrical portion extending along the operating shaft, wherein the case body has a sleeve extending along the operating shaft, between the operating shaft and the cylindrical portion.

6. The drip-proof structure according to claim 5, further comprising a, waterproof cap fixedly mounted to the operating shaft to rotate therewith, the waterproof cap having an enlarged end extending over but separated from an end of the cylindrical portion.

7. The drip-proof structure according to claim 5, wherein the cover has at least one guide rib extending from an outer surface, the at least one guide rib positioned to guide water away from attachment points between the case body and the cover.

8. The drip-proof structure according to claim 6, wherein the cover has at least one guide rib extending from an outer surface, the at least one guide rib positioned to guide water away from attachment points between the case body and the cover.

9. The drip-proof structure according to claim 7, further comprising a waterproof cap fixedly mounted to the operating shaft to rotate therewith, the waterproof cap having an enlarged end extending over but separated from an end of the cylindrical portion.

* * * * *